Patented June 21, 1927.

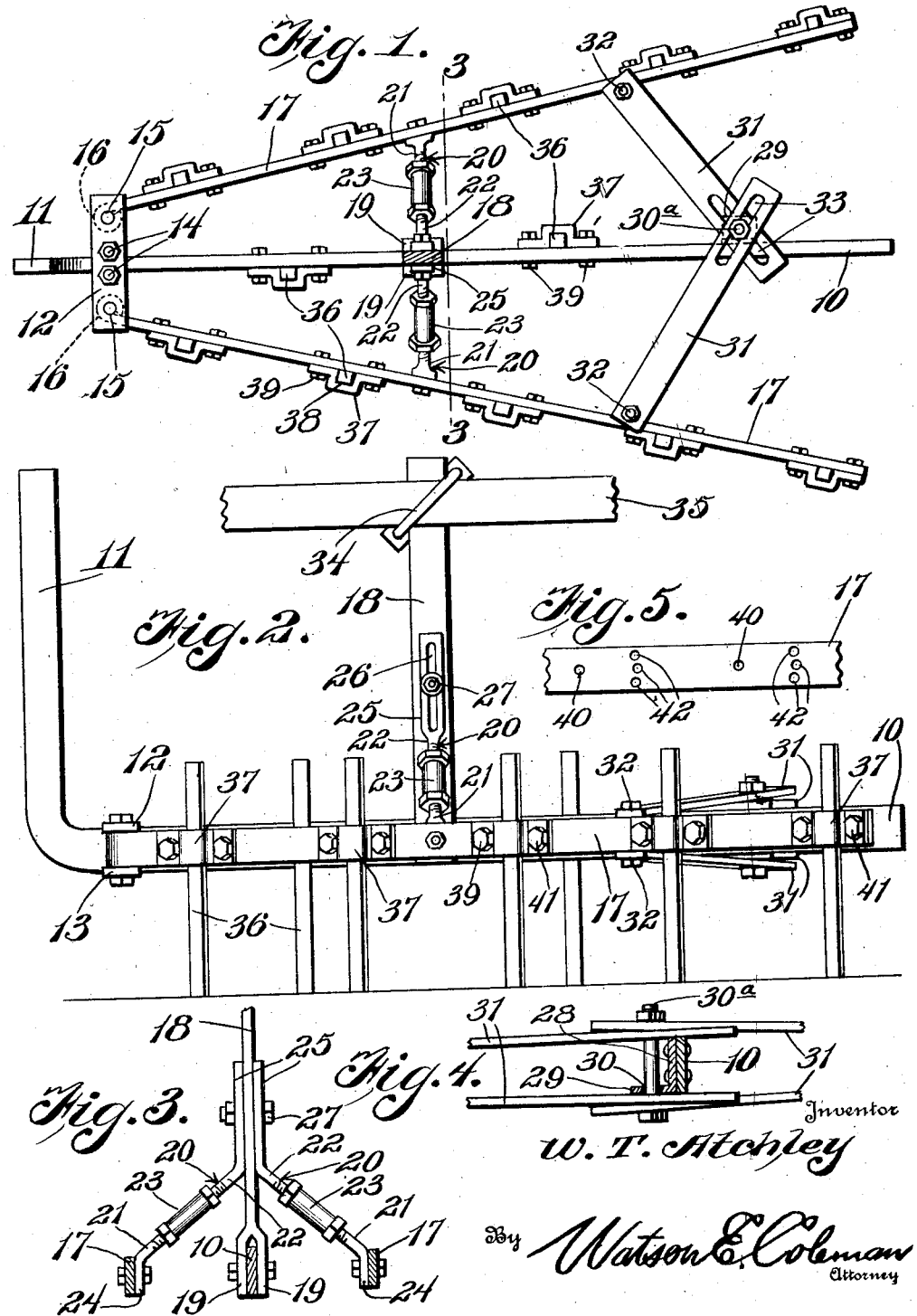

1,633,460

UNITED STATES PATENT OFFICE.

WILLIAM T. ATCHLEY, OF DELTA, COLORADO.

MULCHER ATTACHMENT FOR CULTIVATORS.

Application filed September 17, 1925. Serial No. 56,979.

This invention relates to mulcher attachments for cultivators and has for an important object thereof the provision of a simple and readily constructed device of this character.

A further object of the invention is to provide a device of this character which may be readily attached to a cultivator employing clips which are standard equipment of a majority of cultivators.

A further object of the invention is to provide a device of this character which is readily adjustable as to width.

These and other objects I attain by the construction shown in the accompanying drawing, wherein for the purpose of illustration is shown a preferred embodiment of my invention and wherein:—

Figure 1 is a plan view partially in section of a mulcher attachment for cultivators constructed in accordance with my invention;

Figure 2 is a side elevation thereof, a portion of a part of a cultivator being broken to show the method of attachment;

Figure 3 is a section on the line 3—3 of Figure 1;

Figure 4 is a detail sectional view showing the connections of the rear braces to the middle bar; and Figure 5 is a detail side elevation of one of the side bars showing the manner of attaching the tooth clips thereto.

Referring now more particularly to the drawing, the mulcher attachment comprises a main or central bar 10 having at its forward end a vertically directed angular extension 11. Adjacent the forward end of the bar 10, transversely extending plates 12 and 13 are secured upon the upper and lower sides thereof and held in position by means of bolts 14 passing through the plates at opposite sides of the central bar 10. The outer ends of these plates have mounted therein vertically extending pivots 15, each of which receives an eye 16 formed upon the forward end of a side bar 17.

Approximately midway of the length of the bar 10, it is engaged by a vertically extending bar 18, this bar having at its lower end a fork between the arms 19 of which the bar 10 is received, a bolt passing through the arms of the fork and the bar to hold them in assembled relation. The vertically extending bar 18 is connected with the side bar 17 by extensible downwardly and outwardly inclining arms 20. Each of the arms 20 is formed in two sections 21 and 22 connected by a turn-buckle 23. The section 21 has an angular end portion 24 engaging the inner face of the associated side bar 17 while each section 22 has an angular portion 25 engaging a side face of the vertically extending bar 18. These angular portions 25 have formed therethrough a slot 26 for the passage of a bolt 27 directed through the vertically extending bar.

Adjacent its rear end, the bar 10 has riveted thereto an angle clip 28 having a horizontally extending portion 29 provided with an opening 30 through which a bolt is directed. Adjusting bars 31 have their outer ends pivoted to the side members, as at 32, and their inner ends provided with slots 33 for the passage of the bolt 30ª. The two bars are connected with each side member 17 and these bars, when tightened by means of the bolt 30ª, clamp upon one another and upon the central bar to maintain the central bar and side bars in adjusted position with relation to one another.

It will be obvious that by manipulating the turn-buckles and bars 31, one of the side bars can be moved so that its rear end is more nearly adjacent the central bar than the other of the bars. For this reason and for the reason that the upstanding angular end portion 11 of the bar 10 and the vertically extending bar 18 are rigidly attached by means of clips 34 to the frame 35 of a cultivator with which the mulcher is being employed, the adjustment may be had to properly situate the mulcher with relation to the middle which is to be mulched. This adjustment further permits regulation of the width of the mulcher so that the entire middle may be cultivated.

Means are provided upon each of the main and side bars for attaching mulching teeth 36 thereto. These teeth comprise clips 37, each having an opening 38 of the same width but slightly less depth than the cross section of the tooth, the clips being attached to the bars by bolts 39 which may accordingly clamp the tooth against the bar to hold the same in adjusted position. The forward bolt, in each case, is extended through a single opening 40 formed in the associated bar while the rear bolt 41 is selectively engageable in a series of vertically spaced openings 42 so that the angle of the clip and accordingly the angle of the tooth to the bar may be adjusted. In the construction, the bar 10 is preferably provided with but two tooth clips, one being arranged upon each side face thereof whereas each of the side bars has the clips thereof arranged upon the outer faces thereof.

It will be obvious that a device of this character may be very readily and cheaply produced and is very readily attached to the cultivator with which it is employed. In each case, when employing it with a cultivator, the attachments will number one more than the number of rows treated by the cultivator. For example, a two row cultivator will employ three attachments while a three row cultivator will employ four attachments.

Since the construction of the cultivator is obviously capable of a certain range of change and modification without materially departing from the spirit of the invention, I do not limit myself to such specific structure hereinbefore set forth except as hereinafter claimed.

I claim:—

A mulcher attachment for cultivators comprising a horizontal main bar having a vertically directed forward end, a vertically directed bar rigidly connected with the main bar intermediate its ends, the vertically directed forward end of the main bar and the last named bar being adapted for connection with the beam of a cultivator, a pair of side bars pivoted to the main bar adjacent the forward end of the horizontal section thereof and braces for adjustably positioning the side bars with relation to the main bar extending between the side bars and the vertically directed bar, said braces each comprising two sections and a turn-buckle connecting the sections, one section engaging the associated side bar and being secured thereto, the other section having at its free end an angular portion confronting the vertically directed bar and provided with a longitudinally extending slot.

In testimony whereof I hereunto affix my signature.

WILLIAM T. ATCHLEY.